(12) United States Patent
Hasegawa et al.

(10) Patent No.: US 7,770,778 B2
(45) Date of Patent: Aug. 10, 2010

(54) HEMMING WORKING METHOD AND PANEL ASSEMBLY MANUFACTURING METHOD

(75) Inventors: Eisaku Hasegawa, Tochigi (JP); Katsumi Takeishi, Tochigi (JP); Takeshi Nakamura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/052,266

(22) Filed: Mar. 20, 2008

(65) Prior Publication Data
US 2008/0230588 A1 Sep. 25, 2008

(30) Foreign Application Priority Data
Mar. 23, 2007 (JP) .............................. 2007-076030

(51) Int. Cl.
*B21D 5/16* (2006.01)
*B21D 39/00* (2006.01)

(52) U.S. Cl. ........................ 228/173.6; 72/210; 29/505; 219/86.1

(58) Field of Classification Search .............. 228/173.6, 228/17; 219/86.1, 91.2, 117.1; 72/210–220, 72/306–319, 384–387; 29/505, 509
See application file for complete search history.

(56) References Cited

U.S. PATENT DOCUMENTS
5,237,734 A * 8/1993 Polon .......................... 29/513

FOREIGN PATENT DOCUMENTS
| JP | 08-252674 | 10/1996 |
| JP | 2003103325 A * | 4/2003 |
| JP | 2006-061931 | 3/2006 |
| JP | 2007-030041 | 2/2007 |
| WO | WO 2006137457 A1 * | 12/2006 |

OTHER PUBLICATIONS
JPO machine translation of JP 2003-103325.*
* cited by examiner

*Primary Examiner*—Jessica L Ward
*Assistant Examiner*—Kevin E Yoon
(74) *Attorney, Agent, or Firm*—Rankin, Hill & Clark LLP

(57) ABSTRACT

A hemming working is performed by a positioning step of positioning a first panel formed with a projected portion for welding on a second panel formed with a flange portion; a first bending step of bending the flange portion; and a second bending step of pressing the flange portion on an outer side of the projected portion.

3 Claims, 10 Drawing Sheets

FIG. 10

HEMMING WORKING METHOD AND PANEL ASSEMBLY MANUFACTURING METHOD

This application claims foreign priority from Japanese Patent Application No. 2007-076030 filed on Mar. 23, 2007.

BACKGROUND OF THE INVENTION

1. Field of the Invention

The present invention relates to a hemming working method of coupling a plurality of panels laminated together and a panel assembly manufacturing method using the hemming working method.

2. Background Art

There is a panel member (for example, door panel) used in a vehicle which is constituted by combining two sheets of panels referred to as an inner panel and an outer panel. It is well known to use hemming working in combining the inner panel and the outer panel. In order to couple the inner panel and the outer panel by using hemming working, a flange portion formed at the outer panel is bent relative to the inner panel and the inner panel is pinched by the flange portion and other portion.

In hemming working, as a method of bending the flange portion of the outer panel, there are known roller hemming working for bringing the flange portion into close contact with the inner panel (Patent Reference 1), and press hemming working for bringing the flange portion of the outer panel into close contact with the inner panel by using press forming (Patent Reference 2).

Further, in the hemming working, in order to promote a strength of bonding the inner panel and the outer panel, it is known to carry out projection welding at a portion to be bonded (Patent Reference 3). Projection welding is a kind of spot welding providing a plurality of projected portions at the inner panel, and a current is made to flow concentratedly to a position of the projected portion to thereby heat and press to bond.

In hemming working carried out prior to projection welding, it is necessary to prevent the projected portion from being crushed. That is, when a roller is rolled in roller hemming working, it is necessary to reduce a press force at a position of the projected portion or reduce the press force to the projected portion by moving the roller in a direction of being separated from the inner panel. Further, in press hemming working, it is necessary to reduce or nullify the press force to the projected portion by forming a recessed portion at a position of the flange portion in correspondence with the projected portion.

[Patent Reference 1] JP-A-2007-030041
[Patent Reference 2] JP-A-2006-061931
[Patent Reference 3] JP-A-08-252674

However, when a measure for preventing the projected portion from being crushed as described above is carried out, there is a case in which a sufficient bonding strength by projection welding is not achieved. That is, at a position of the projected portion, the flange portion cannot strongly be pressed to the inner panel, and therefore, the flange portion is brought into a state of being floated up from the projected portion. Further, when the position of the projected portion is pressed by a welding electrode under the state, a region of bringing the projected portion and the flange portion into contact with each other is narrowed, and therefore, a welding range is reduced, and a sufficient bonding strength cannot be achieved (refer to columns of the related art of FIG. 9 and FIG. 10). Further, the contact region is narrowed as described above, and therefore, sputtering is easy to be brought about in projection welding. Further, in roller hemming working, the roller is rolled by reducing a force of pressing the projected portion, and therefore, there is a case in which an edge of bending the flange portion is considerably bulged at the portion of the projected portion to pose a problem in view of an appearance thereof.

SUMMARY OF THE INVENTION

One or more embodiments of the invention provide a hemming working method and a panel assembly manufacturing method capable of promoting a bonding strength of a projection welding portion.

In addition, one or more embodiments of the invention provide a hemming working method and a panel assembly manufacturing method capable of restraining sputtering from being brought about in projection welding.

Moreover, one or more embodiments of the invention provide a hemming working method and a panel assembly manufacturing method capable of promoting an appearance of a panel assembly.

In accordance with one or more embodiments of the invention, a hemming working method is provided with: a positioning step of positioning a first panel formed with a projected portion for welding on a second panel formed with a flange portion to position; a first bending step of bending a total of the flange portion; and a second bending step of pressing the flange portion on an outer side of the projected portion.

In the one or more embodiments, the second bending step of making the portion of the flange portion proximate to the first panel is carried out by pressing the flange portion of the second panel on the outer side of the projected portion of the first panel in addition to the first bending step. Thereby, the portion of the flange portion on the outer side of the projected portion is made to be proximate to the first panel. When the projected portion is pressed by a welding electrode under the state, the flange portion on the outer side of the projected portion is deformed in a direction of being brought into contact with the projected portion to widen a contact area of the flange portion and the projected portion. Therefore, a bonding strength of the projection welding portion can be promoted, and sputtering can be restrained from being brought about in the projection welding. Further, by making the portion of the flange portion on the outer side of the projected portion proximate to the first panel, a radius of curvature of a bent edge of the flange portion is reduced and an outlook of the panel assembly can be promoted.

As the hemming working method, a roller hemming working method or a press hemming working method can be used.

When the roller hemming working method is utilized, a hemming roller having a taper portion and a circular cylinder portion may be used, the first bending step may include a preparatory bending step of bending the flange portion by using the taper portion of the hemming roller, and a regular bending step of bringing the flange portion into close contact with the first panel by bending the flange portion at other than a position in correspondence with the projected portion by using the circular cylinder portion of the hemming roller and forming a clearance between the flange portion and the projected portion by bending the flange portion at a position in correspondence with the projected portion. The second bending step may be carried out by using an end portion of the circular cylinder portion of the hemming roller on a side of the taper portion.

Thereby, all of the first bending step comprising the preparatory bending step and the regular bending step and the second bending step may be carried out by the single hemming roller, which is advantageous in view of a processing speed or a production cost.

In accordance with one or more embodiments of the invention, a panel assembly manufacturing method is provided with the respective steps of the hemming working method mentioned above, and a projection welding step of carrying out a projection welding at the position in correspondence with the projected portion.

According to the one or more embodiments of the invention, there is a carried out the second bending step of making the portion of the flange portion proximate to the first panel by pressing the flange portion of the second panel on the outer side of the projected portion of the first panel in addition to the first bending step which has been carried out in the related art. Thereby, the portion of the flange portion on the outer side of the projected portion is made to be proximate to the first panel. When the projected portion is pressed by a welding electrode under the state, the flange portion on the outer side of the projected portion is deformed in a direction of being brought into contact with the projected portion, and the contact region of the flange portion and the projected portion is widened. Therefore, the bonding strength of the projection welding portion can be promoted and sputtering can be restrained from being brought about in the projection welding. Further, by making the portion of the flange portion on the outer side of the projected portion proximate to the first panel, a radius of curvature of the bent edge of the flange portion is reduced, and an outlook of the panel assembly can be promoted.

Other aspects and advantages of the invention will be apparent from the following description, the drawings and the claims.

BRIEF DESCRIPTION OF THE DRAWINGS

FIG. 10 is a view of comparing a projection welding processing after the roller hemming working processing according to the exemplary embodiment of FIG. 9 and a projection welding processing after the roller hemming working processing according to the related art of FIG. 9.

DETAILED DESCRIPTION OF THE EXEMPLARY EMBODIMENTS

An exemplary embodiment of the invention will be explained as follows in reference to the drawings.

Further, in drawings referred to as follows, corresponding constituent elements are attached with the same notations and a detailed explanation thereof will be omitted.

1. Basic Apparatus Constitution

According to a panel assembly manufacturing method of the exemplary embodiment, a door panel as a panel assembly is manufactured by carrying out a roll hemming working step of subjecting a work W comprising an inner panel w1 and an outer panel w2 to roll hemming working, and a projection welding step of carrying out projection welding for the work W subjected to the roll hemming working.

Figure 1:
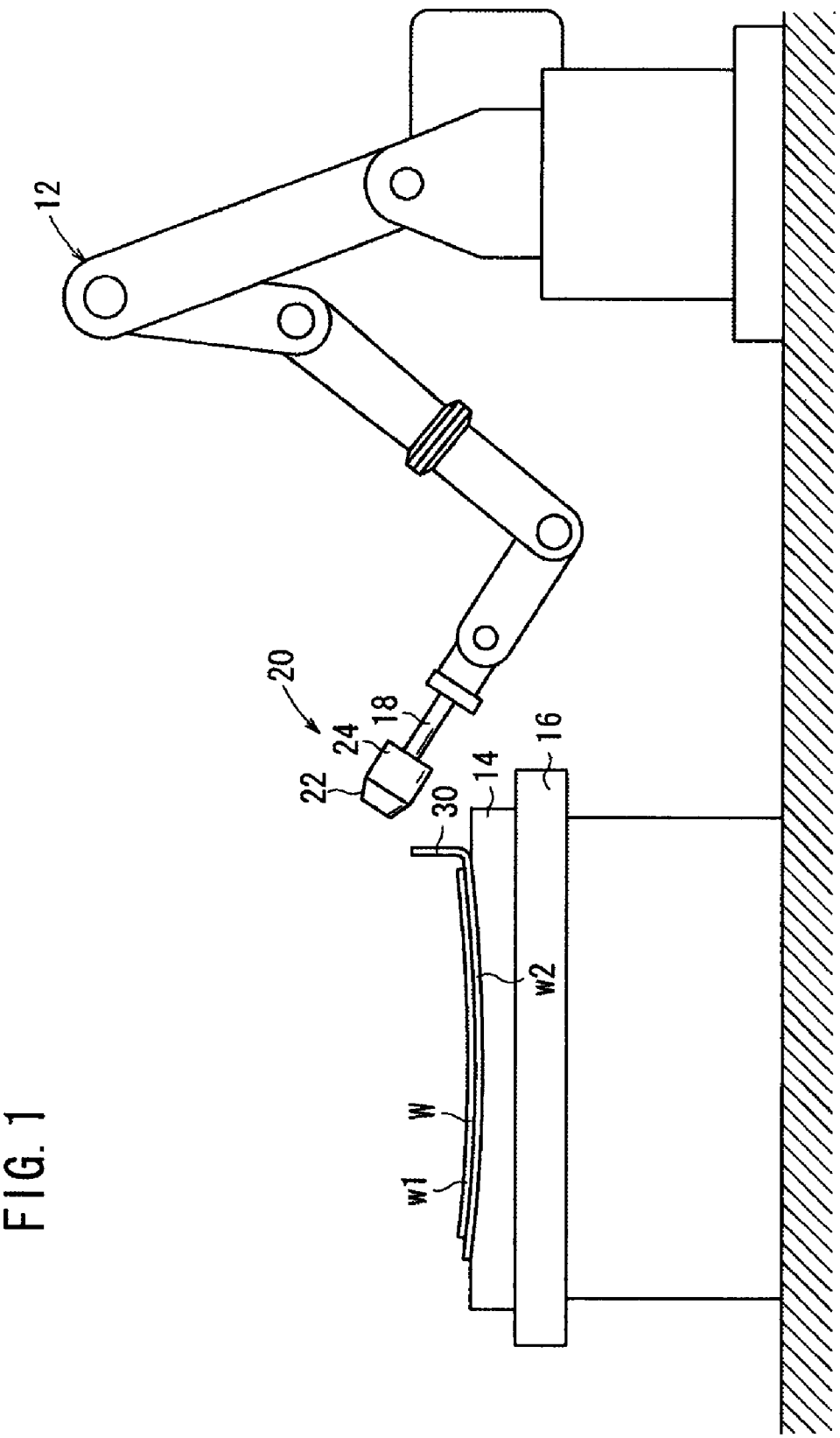
FIG. 1 is an outlook view of a hemming working apparatus according to an exemplary embodiment of the invention.

FIG. 1 shows a hemming working apparatus 10 used for carrying out the roll hemming working step. The hemming working apparatus 10 includes an articulated type robot 12 an operation of which is controlled by a controller, not illustrated, a die 14 for mounting to fix the work W, and a work table 16 for holding the die 14.

Figure 3:
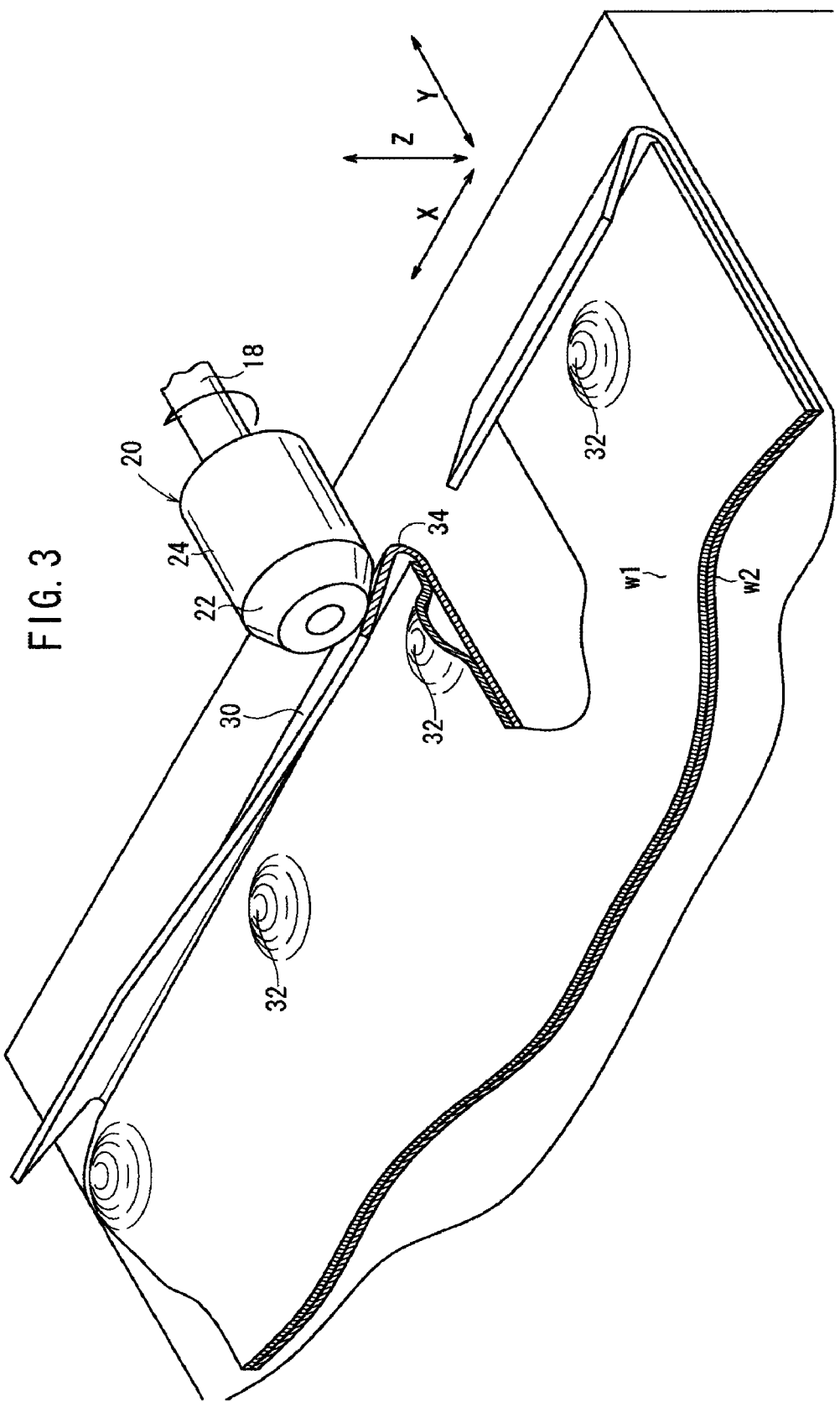
FIG. 3 is a partially enlarged sectional view of a preparatory bending processing according to the panel assembly manufacturing method of FIG. 2.

The robot 12 includes a hemming roller 20 at a front end thereof, and subjects the work W to roll hemming working by rolling the hemming roller 20 along an outer periphery of the work W (refer to, for example, FIG. 3).

Figure 7A:
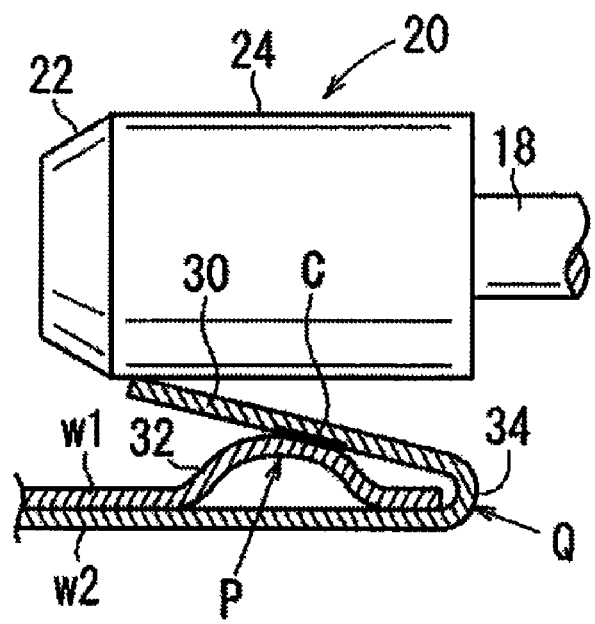
FIG. 7A is a partially enlarged sectional view viewing the state of FIG. 5 from other angle.

As shown by FIG. 1, FIG. 3 and FIG. 7A, the hemming roller 20 comprises a taper portion 22 provided at a front end side thereof and having an angle of inclination of 45° relative to an axis line of the hemming roller 20, and a circular cylinder portion 24 provided at a base end side by a structure integral with the taper portion 22. Further, the hemming roller 20 is axially supported rotatably by a support shaft 18 connected to a frontmost end shaft of the robot 12.

In the projection welding step, a publicly known projection welding apparatus, for example, disclosed in Patent Reference 3 can be used.

2. Details of Panel Assembly Manufacturing Method

Figure 2:
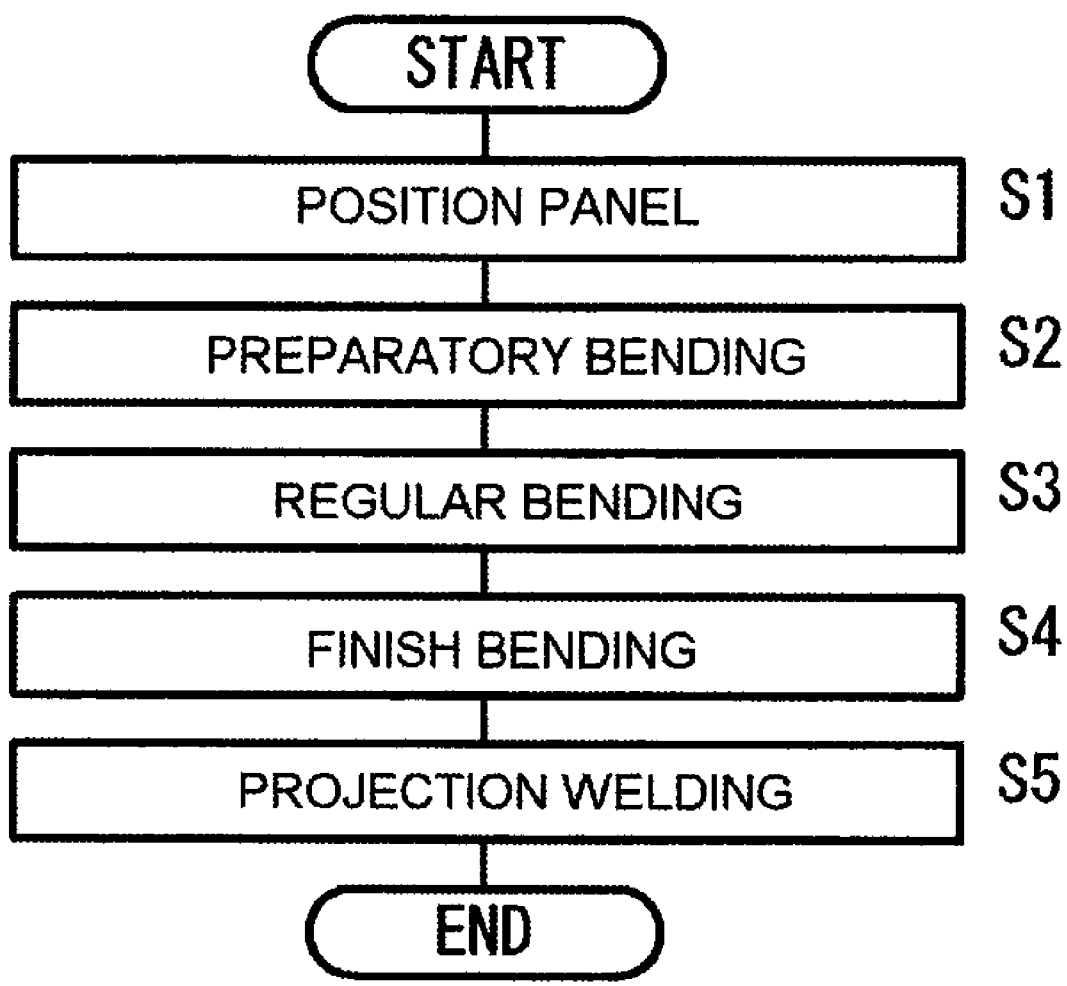
FIG. 2 is a flowchart of a panel assembly manufacturing method according to the exemplary embodiment of the invention.

Next, details of the panel assembly manufacturing method according to the embodiment will be explained in reference to a flowchart of FIG. 2.

At step S1, the outer panel w2 is fixed onto the die 14 by a work carrying apparatus, not illustrated, further, the inner panel w1 is made to overlap the outer panel w2 to position the two panels.

At step S2, a preparatory bending processing is carried out by using the hemming working apparatus 10. That is, as shown by FIG. 3, by rolling the hemming roller 20 in a direction indicated by an arrow mark X in FIG. 3 while pressing the taper portion 22 of the hemming roller 20 to a flange portion 30 of the outer panel w2, the flange portion 30 is inclined to bend by 45° continuously in an inner side direction. Further, a reference notation 32 in the drawing designates a projected portion previously formed at the inner panel w1.

Figure 4:
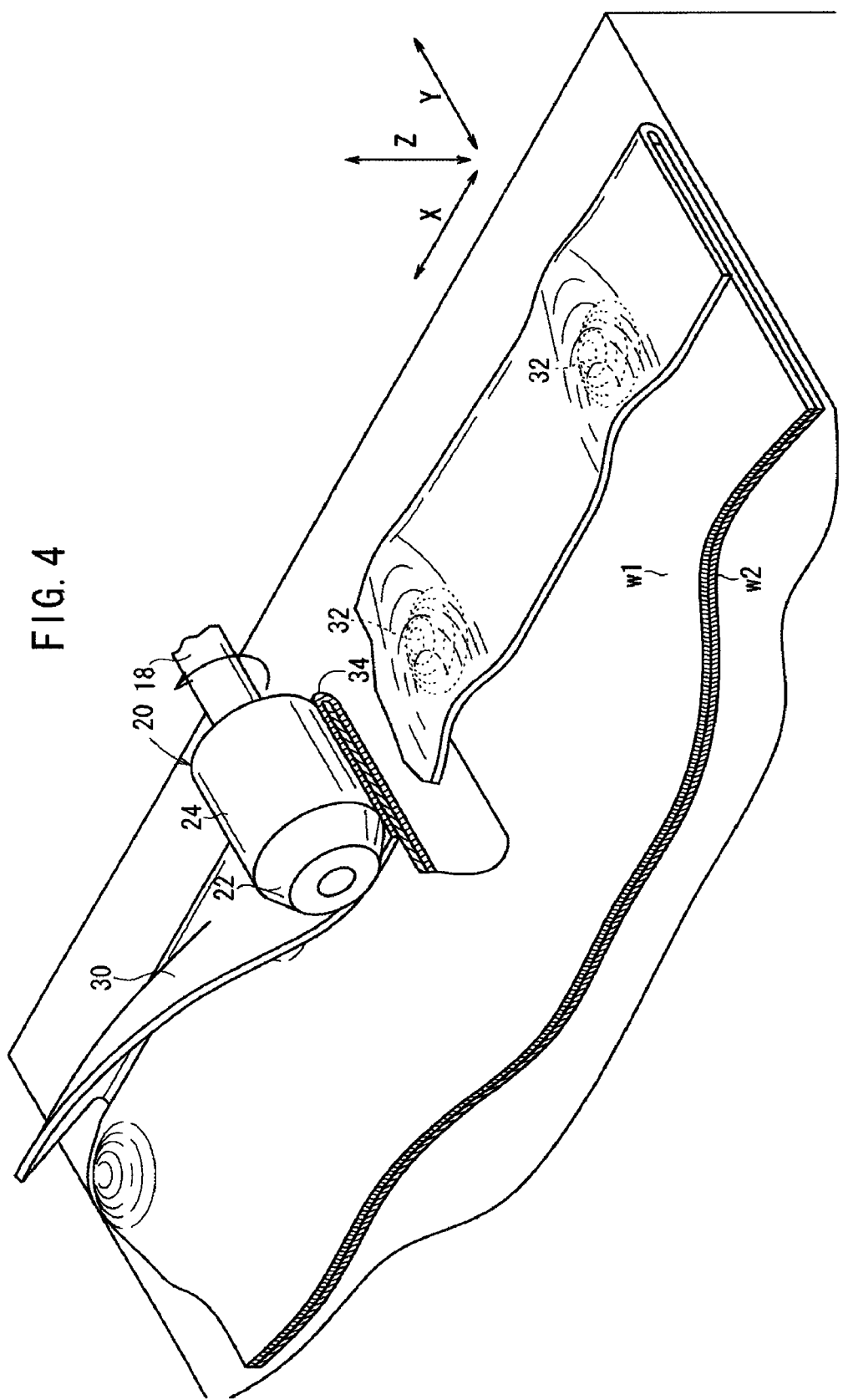
FIG. 4 is a partially enlarged sectional view of a state of passing a hemming roller at other than a projected portion in a regular bending processing according to the panel assembly manufacturing method of FIG. 2.

At step S3, a regular bending processing is carried out by using the hemming working apparatus 10. That is, as shown by FIG. 4, after moving the hemming roller 20 in directions indicated by an arrow mark Y and an arrow mark Z in FIG. 4, by rolling the hemming roller 20 in the direction indicated by the arrow mark X in FIG. 4 while pressing the circular cylinder portion 24 of the hemming roller 20 to the flange portion 30 of the outer panel w2, the flange portion 30 is continuously brought into close contact with a surface of the inner panel w1.

Figure 5:
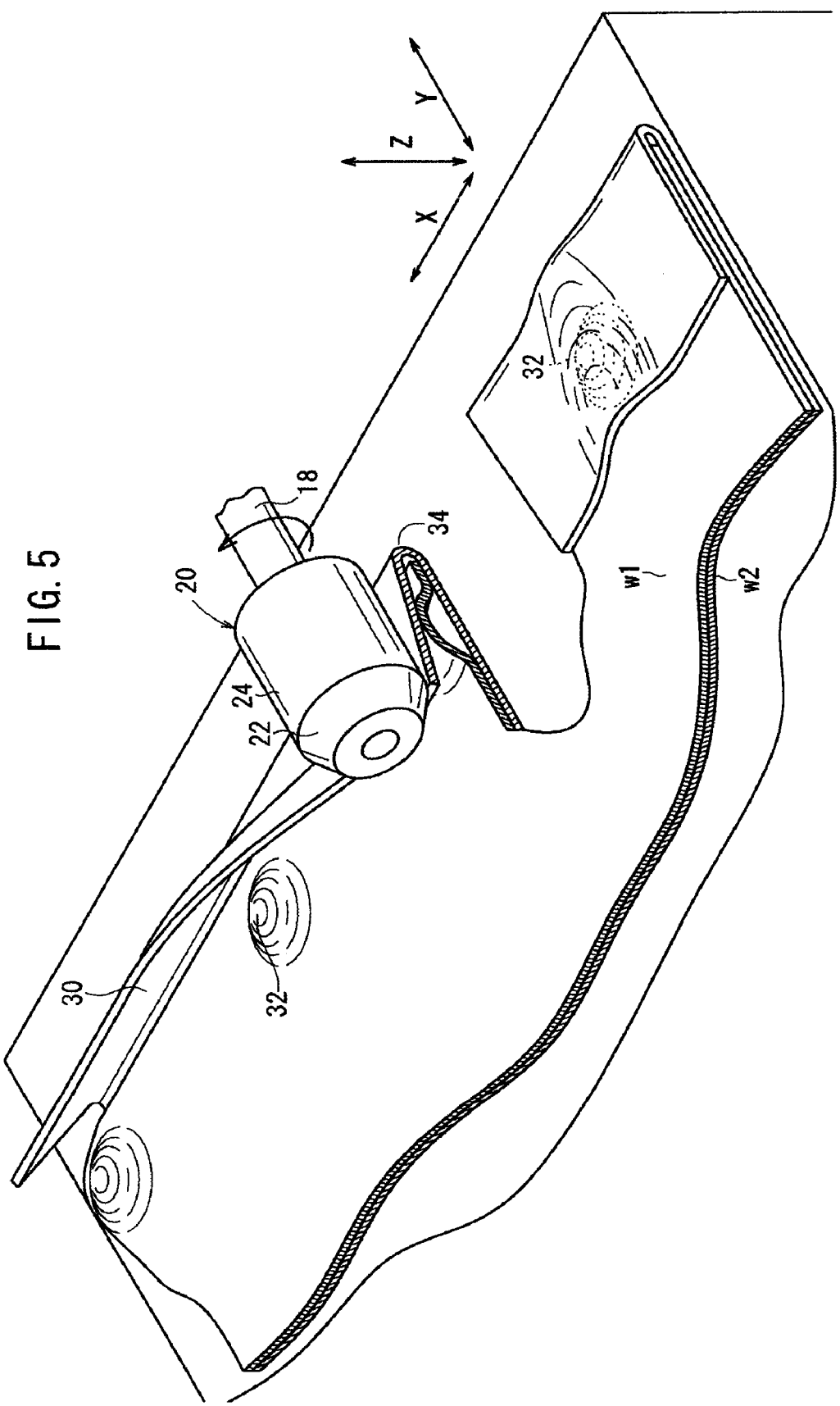
FIG. 5 is a partially enlarged sectional view of a state of passing the hemming roller at the projected portion in the regular bending processing according to the panel assembly manufacturing method of FIG. 2.

However, as shown by FIG. 5 and FIG. 7A, at a position in correspondence with the projected portion 32 of the inner panel w1, in order to avoid that projection welding cannot be carried out by crushing the projected portion 32, a force of pressing the flange portion 30 by the hemming roller 20 is weakened. That is, the press force of the hemming roller 20 is adjusted, and the press force to a degree of bringing the flange portion 30 into contact with the projected portion 32 slightly is exerted. Or, the hemming roller 20 may be rolled while producing a slight clearance between the flange portion 30 and the projected portion 32 by moving the hemming roller 20 in a direction of being remote from the inner panel w1 (direction indicated by an arrow mark Z in FIG. 5). Thereafter, the flange portion 30 is moved in the direction of being remote from the projected portion 32 by an elasticity thereof (spring back), in either of the cases, a slight clearance is produced between the flange portion 30 and the projected portion 32 (also referred to "after regular bending" of FIG. 9).

Figure 6:
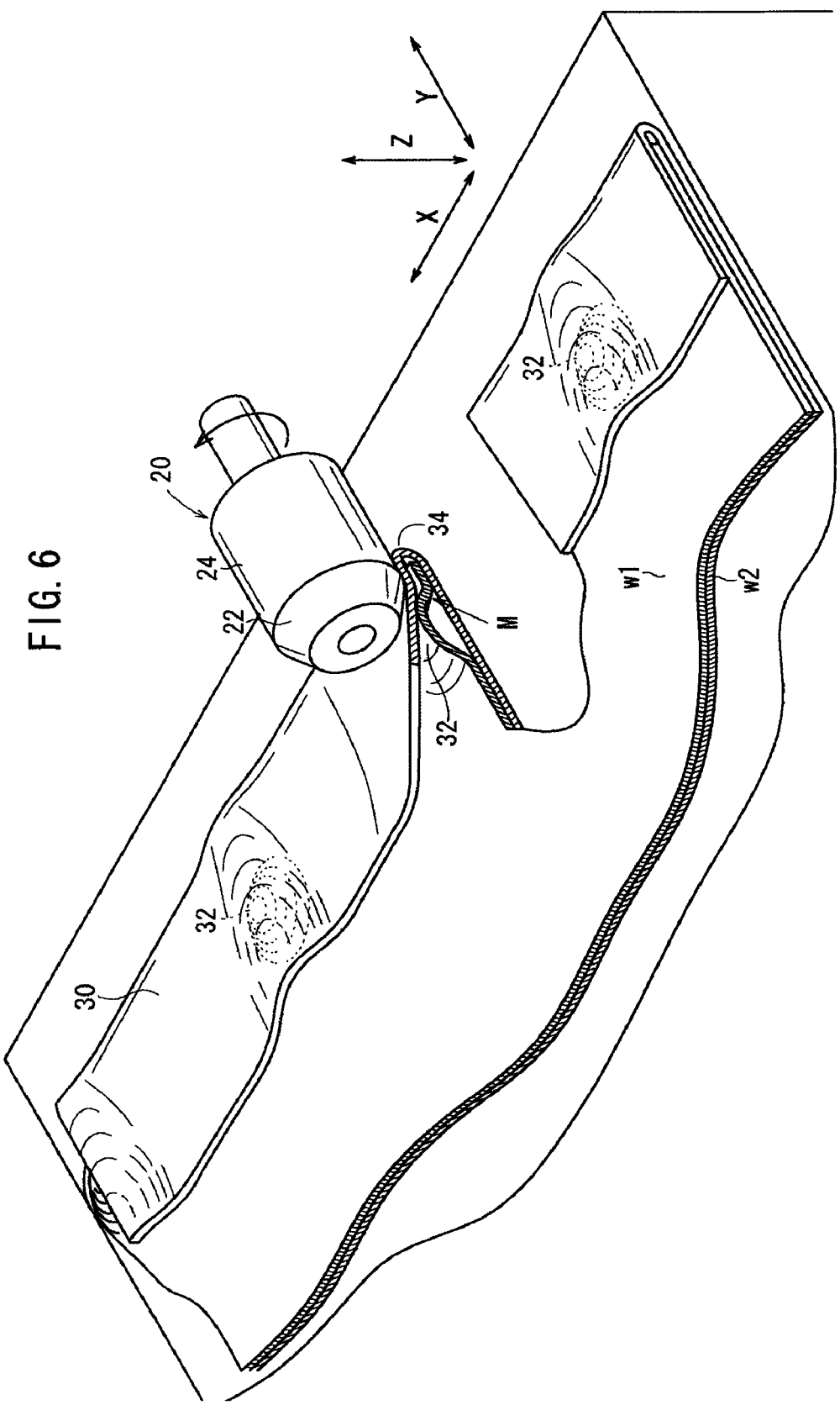
FIG. 6 is a partially enlarged sectional view of a finish bending processing according to the panel assembly manufacturing method of FIG. 2.
Figure 7B:
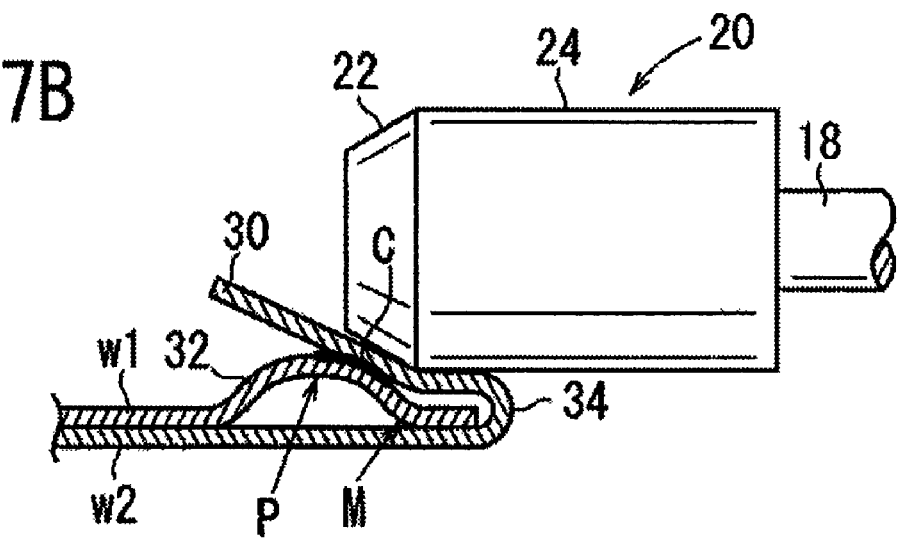
FIG. 7B is a partially enlarged sectional view viewing the state of FIG. 6 from other angle.

At step S4, a finish bending processing is carried out by using the hemming working apparatus 10. That is, as shown by FIG. 6 and FIG. 7B, the hemming roller 20 is moved in directions indicated by the arrow mark Y and the arrow mark Z in FIG. 6, and an end portion of the circular cylinder portion 24 on the side of the taper portion 22 is disposed at a position in correspondence with a position M on an outermost side of the projected portion 32. Further, the hemming roller 20 is rolled in the direction indicated by the arrow mark X in FIG. 6. Thereby, a contact region C of the flange portion 30 and the projected portion 32 before finish bending is moved to an outer side and a lower side (refer to FIG. 7A and FIG. 7B) and a radius of curvature of a bent edge 34 of the outer panel w2 is reduced.

Figure 8A:
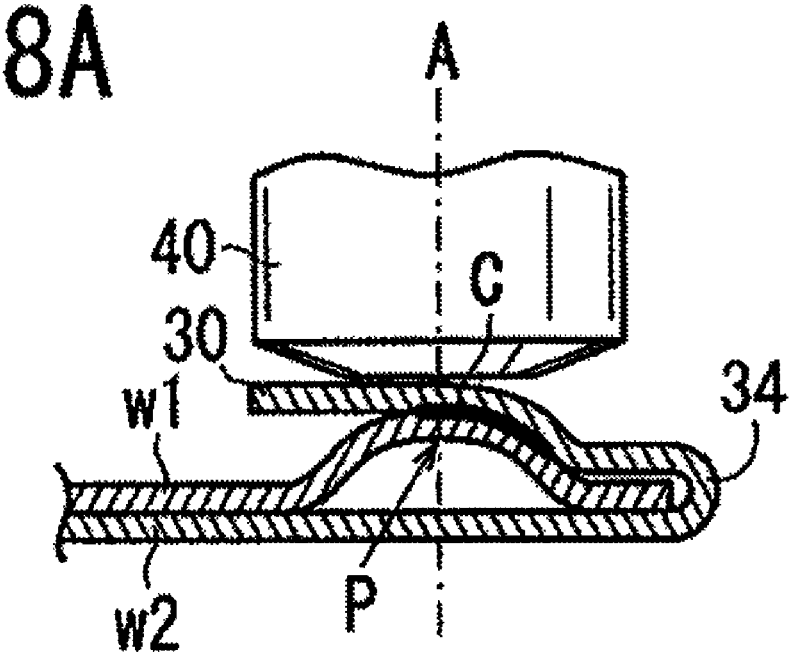
FIG. 8A is a partially enlarged sectional view showing a state in projection welding according to the panel assembly manufacturing method of FIG. 2.
Figure 8B:
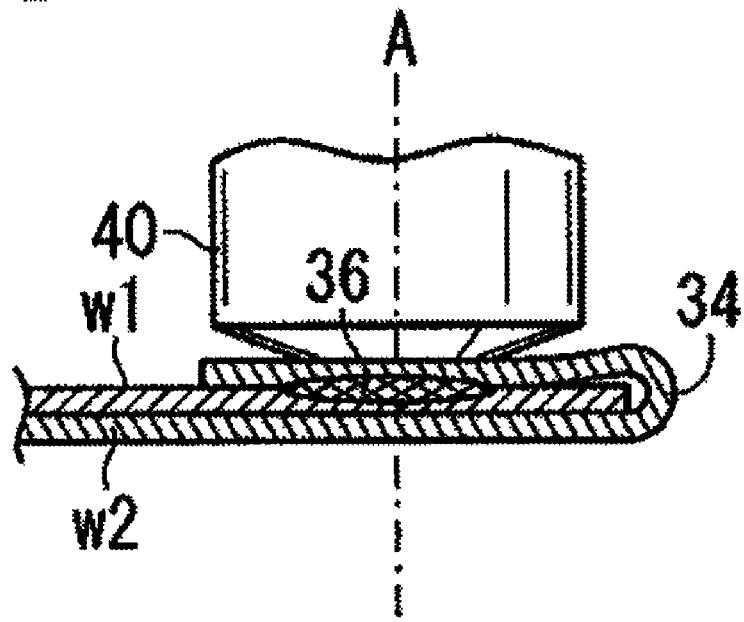
FIG. 8B is a partially enlarged sectional view showing a state after the projection welding according to the panel assembly manufacturing method of FIG. 2.

At step S5, projection welding is carried out by using a publicly-known projection welding apparatus. That is, as shown by FIG. 8A, a welding electrode 40 is moved down to correspond to an axis line A of the welding electrode 40 and a top point P of the projected portion 32. As described above, by the finish bending step, the contact region C of the flange portion 30 and the projected portion 32 is moved to the outer side and the lower side of the top point P of the projected portion 32 (refer to FIG. 7B), and therefore, when the flange portion 30 is pressed by the welding electrode 40, the contact region C is expanded from the position of the FIG. 7B to a vicinity of the top point P of the projected portion 32 (refer to FIG. 8A). By carrying out projection welding by conducting electricity to the welding electrode 40 under the state, a nugget 36 is formed between the inner panel w1 and the outer panel w2 (refer to FIG. 8B).

Figure 9:
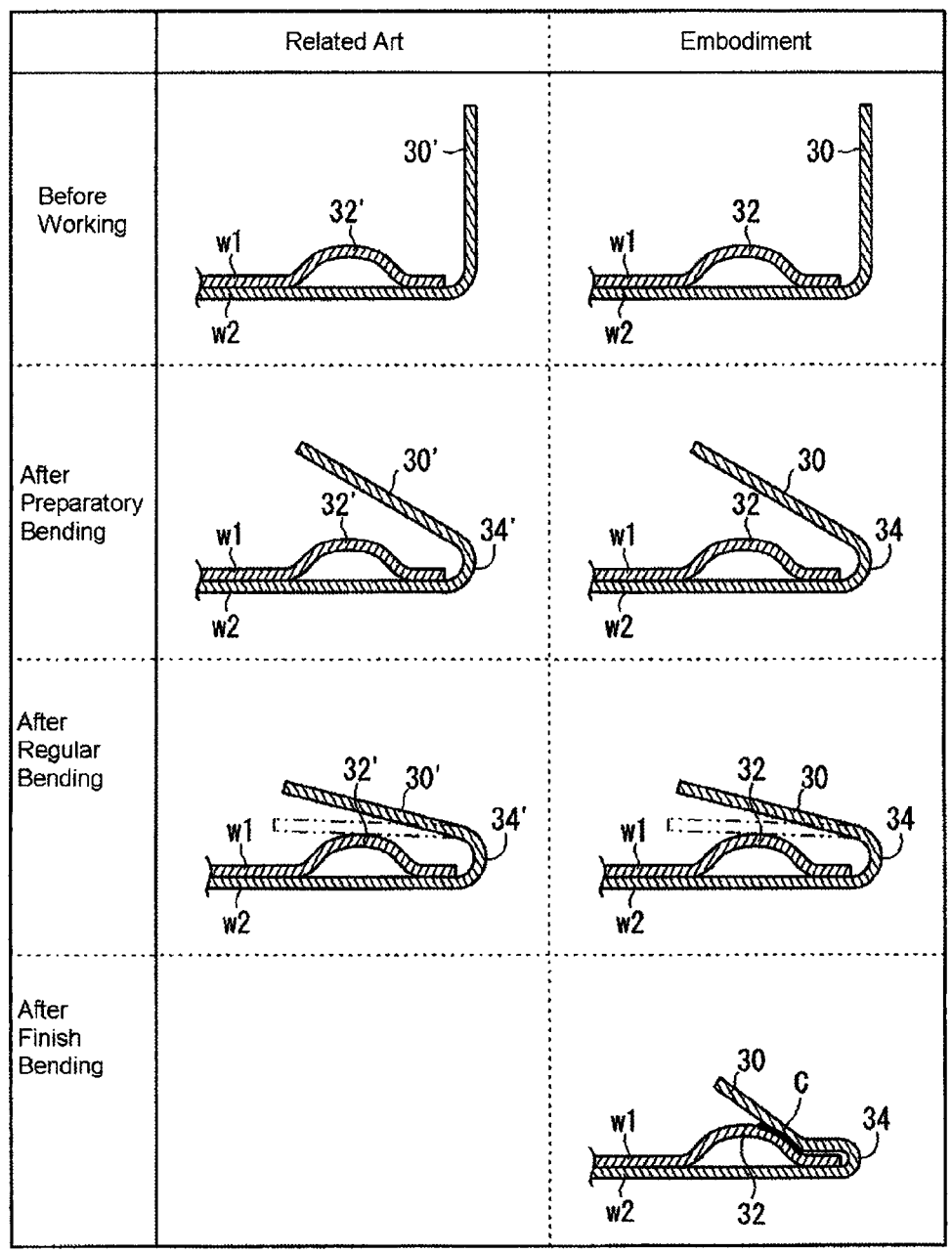
FIG. 9 is a view of comparing the roller hemming working processing according to the exemplary embodiment and a roller hemming working processing according to a related art.

3. Comparison Between Method of the Exemplary Embodiment and Related Art Method FIG. 9 illustrates views of comparing the roller hemming working method according to the exemplary embodiment and the roller hemming working method according to the related art. In this case, a reference notation used for explaining the exemplary embodiment of the invention is attached with "'" (apostrophe) to be provided for an explanation of a corresponding member of the related art.

The two methods stay the same until "before working", "after preparatory bending" and "after regular bending". However, finish bending is carried out only in the embodiment, and therefore, a shape of the flange portion 30 "after finish bending" is present only in the exemplary embodiment. That is, a constitution of reducing the radius of curvature of the bent edge 34 and widening the region C of bringing the flange portion 30 and the projected portion 32 into contact with each other is provided only in the exemplary embodiment.

Further, in FIG. 9, broken line portions in the state of "after regular bending" indicate positions of the flange portions 30, 30' when the flange portions 30, 30' are pressed by the hemming roller 20, and bold line portions indicate positions of the flange portions 30, 30' which are sprung back after passing the hemming roller 20.

Figure 10:
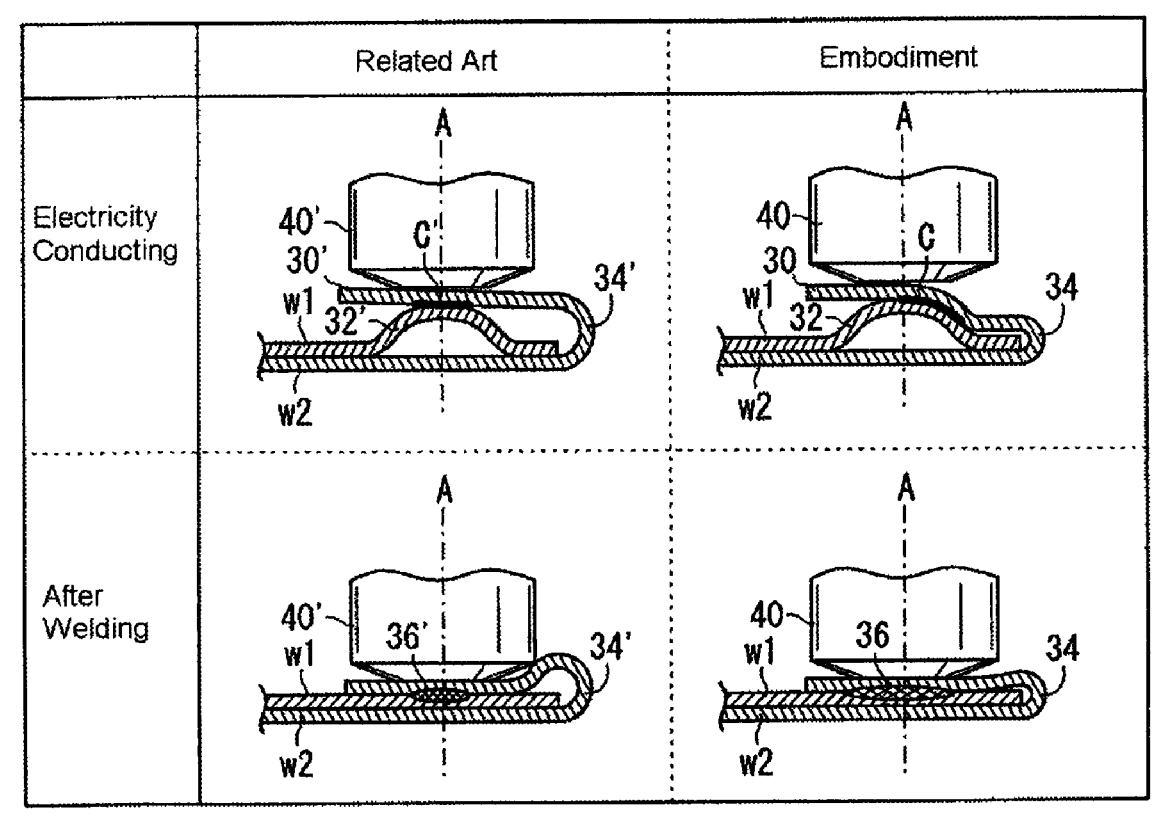

As shown by FIG. 10, in states of "electricity conducting" and "after welding", in comparison with a contact region C' of the flange portion 30' and the projected portion 32' of the related art, the contact region C according to the exemplary embodiment is enlarged. In other words, with regard to ranges of the nuggets 36, 36' after projection welding, the range is wider in the method according to the exemplary embodiment than in the method according to the related art. Further, with regard to radii of curvature of the bent edges 34, 34', the radius is smaller in the exemplary embodiment than in the related art.

4. Effect of the Embodiment

As described above, the hemming working method according to the exemplary embodiment includes the positioning step (step S1) of overlapping the inner panel w1 formed with the projected portion 32 for welding and the outer panel w2 formed with the flange portion 30 to position, the preparatory bending step and the regular bending step (steps S2, S3) for bending a total of the flange portion 30, and the finish bending step (step S4) of pressing the flange portion on the outer side of the projected portion 32.

According to the hemming working method according to the exemplary embodiment, there is carried out the finish bending step of making a portion of the flange portion 30 proximate to the inner panel w1 by pressing the flange portion of the outer panel w2 on the outer side of the projected portion 32 of the inner panel w1 in addition to the preparatory bending step and the regular bending step which have been carried out in the related art. Thereby, the portion of the flange portion 30 on the outer side of the projected portion 32 is made to be proximate to the inner panel w1. When the projected portion 32 is pressed by the welding electrode 40 under the state, the flange portion 30 on the outer side of the projected portion 32 is deformed in the direction of being brought into contact with the projected portion 32 and the contact region C of the flange portion 30 and the projected portion 32 is widened. Therefore, the bonding strength of the projection welding portion can be promoted and sputtering can be restrained from being brought about in projection welding. Further, by making the portion of the flange portion 30 on the outer side of the projected portion 32 proximate to the inner panel w1, the radius of curvature of the edge 34 of the flange portion 30 is reduced, and an appearance of the work W (door panel) can be promoted.

Further, according to the exemplary embodiment, there are carried out the preparatory bending step (step S2) by using the taper portion 22 of the hemming roller 20 by using the hemming roller 20 having the taper portion 22 and the circular cylinder portion 24, the regular bending step (step S3) by using the circular cylinder portion 24 of the hemming roller 20, and the finish bending step (step S4) by using the end portion of the circular cylinder portion 24 on the side of the taper portion 22.

Thereby, all of the preparatory bending step, the regular bending step and the finish bending step can be carried out by the single hemming roller 20, a processing time period is shortened, and production cost is reduced.

5. Modified Examples

Further, the invention is not limited to the exemplary embodiment but various constitutions can naturally be adopted based on a content described in the specification. For example, constitutions of (1) and (2) shown below can be adopted.

(1) Hemming Roller

Although according to the embodiment, the hemming roller 20 having the taper portion 22 and the circular cylinder portion 24 is used, the invention is not limited thereto. For example, a hemming roller comprising only a circular cylinder portion can also be used. In this case, the respective bending processings can be carried out by adjusting a pressing angle and a pressing direction of the hemming roller relative to the flange portion 30 by displacing an arm of the robot 12. Further, the respective bending processings may be carried out by using separate hemming rollers.

(2) Panel Assembly

Although according to the exemplary embodiment, the door panel is pointed out as the work W, other panel assembly will do so far as the panel assembly is subjected to projection welding after hemming working.

While description has been made in connection with the specific exemplary embodiment and the modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

10 . . . hemming working apparatus
12 . . . robot
14 . . . die
20 . . . hemming roller
22 . . . taper portion
24 . . . circular cylinder portion
30 . . . flange portion
32 . . . projected portion
40 . . . welding electrode
W . . . work (panel assembly)
w1 . . . inner panel (first panel)
w2 . . . outer panel (second panel)

What is claimed is:

1. A hemming working method comprising the steps of:
   providing a hemming working apparatus including a hemming roller rotatably connected to a shaft, the hemming roller having a circular cylindrical portion having a proximal end connected to the shaft and a taper portion extending from a distal end of the cylindrical portion;
   a positioning step of positioning a first panel formed with a projected portion for welding on a second panel formed with a flange portion;
   a first bending step that includes the steps of:
      a preparatory step of partially bending the flange portion toward the first panel with the taper portion of the hemming roller; and
      a regular bending step of further bending the flange portion toward the first panel with the circular cylindrical portion of the hemming roller; and
   a second bending step of pressing an end portion of the flange portion toward a surface of the inner panel situated between the projected portion and a bent edge of the flange portion with the distal end of the cylindrical portion such that the end portion of the flange portion is in close contact with the surface of the first panel while simultaneously forming a contact region on a side of the projected portion nearest to the bent edge with the taper portion.

2. The hemming working method according to claim 1, wherein during the regular bending step the flange portion is in close contact with a surface of the first panel at a position not in correspondence with the projected portion and wherein a clearance is formed between the flange portion and the projected portion.

3. The hemming working method according to claim 2 further comprising the step of a projection welding step of projection welding at a position in correspondence with the projected portion.

* * * * *